May 10, 1966  B. THIER  3,250,311
WIPED FALLING FILM EVAPORATOR
Filed Jan. 22, 1964  6 Sheets-Sheet 1

Inventor
Bernd Thier
By Pierce, Scheffler & Parker
Attorneys

May 10, 1966  B. THIER  3,250,311
WIPED FALLING FILM EVAPORATOR
Filed Jan. 22, 1964  6 Sheets-Sheet 4

Inventor
Bernd Thier
By Pierce, Scheffler + Parker
Attorneys

May 10, 1966  B. THIER  3,250,311
WIPED FALLING FILM EVAPORATOR
Filed Jan. 22, 1964  6 Sheets-Sheet 5

Inventor
Bernd Thier
By Pierce, Scheffler & Parker
Attorneys

May 10, 1966  B. THIER  3,250,311
WIPED FALLING FILM EVAPORATOR
Filed Jan. 22, 1964  6 Sheets-Sheet 6

Inventor
Bernd Thier
By Pierce, Scheffler & Parker
Attorneys

United States Patent Office 3,250,311
Patented May 10, 1966

3,250,311
WIPED FALLING FILM EVAPORATOR
Bernd Thier, Marl, Germany, assignor to Chemische Werke Huls Aktiengesellschaft, Kreis Recklinghausen, Germany, a corporation of Germany
Filed Jan. 22, 1964, Ser. No. 339,469
Claims priority, application Germany, July 25, 1963, C 30,533
6 Claims. (Cl. 159—6)

Different types of film evaporators have been proposed which differ from each other principally with respect to the kind of mechanism used for the production of a film of the liquid to be evaporated on the inner surface of the wall of the evaporator. Film evaporators are described in Chemie-Ingenieur-Technik, No. 25 (1953) pages 573-4 and No. 27 (1955), pages 251-61 as well as in German Patent No. 915,450 in which the film is formed by rotating wipers, vanes or the like. The vanes which run at a short distance from the wall and produce a ventilating action do not contact the wall and cannot therefore separate therefrom high viscosity or solid material encrusted upon the wall. Also scraping, vibrating suspended wipers cannot adequately remove materials having a tendency to bake or form a crust on the wall because the suspended wipers can yield inwardly in the centrifugal field.

In German Patent No. 1,044,764 roller elements are proposed which exert only a slight rubbing action on the vaporizer wall and do not provide an adequate shearing action to separate viscous or solid material from the wall.

In the working of highly viscous materials having a tendency to form a crust it is necessary to provide for an effective separation at the instant of the deposition of the product on the vaporizer wall. This requirement is fulfilled simply and completely by a rotor for distributing the liquid and for separating the deposited product which has radially elastically and rotatably supported unround or polygonal sliding elements at its periphery, said elements having cutting edges between their side surfaces.

The unround sliding elements having cutting edges may be any structure having a two or more cornered cross section and whose surfaces between the cutting edges are either plane, concave, convex, stepped or grooved etc.

The unround sliding elements are rotatably mounted. It is especially advantageous if the sliding elements are in the form of sleeves which are fitted over a shaft or the like.

Since the unround sliding elements do not have a uniform radius but always have a surface or edges in contact with the wall of the film evaporator it is necessary that they be radially movable preferably by an elastic mounting. Such a result can be obtained for example by making the sliding elements in the form of sleeves and sliding them on to a stretched rod, band or spring that is capable of vibrating as disclosed in German Patent No. 1,136,982. The stretched or tensioned bands may be in the form of wires or preferably in the form of spiral springs.

The invention is illustrated in the accompanying drawings in which.

The evaporators have the customary vapor exhaust outlets in their upper portions, feed inlets below the exhaust outlets and concentrate outlets at their bottom portions which are not shown in the accompanying drawings.

Figure 1:
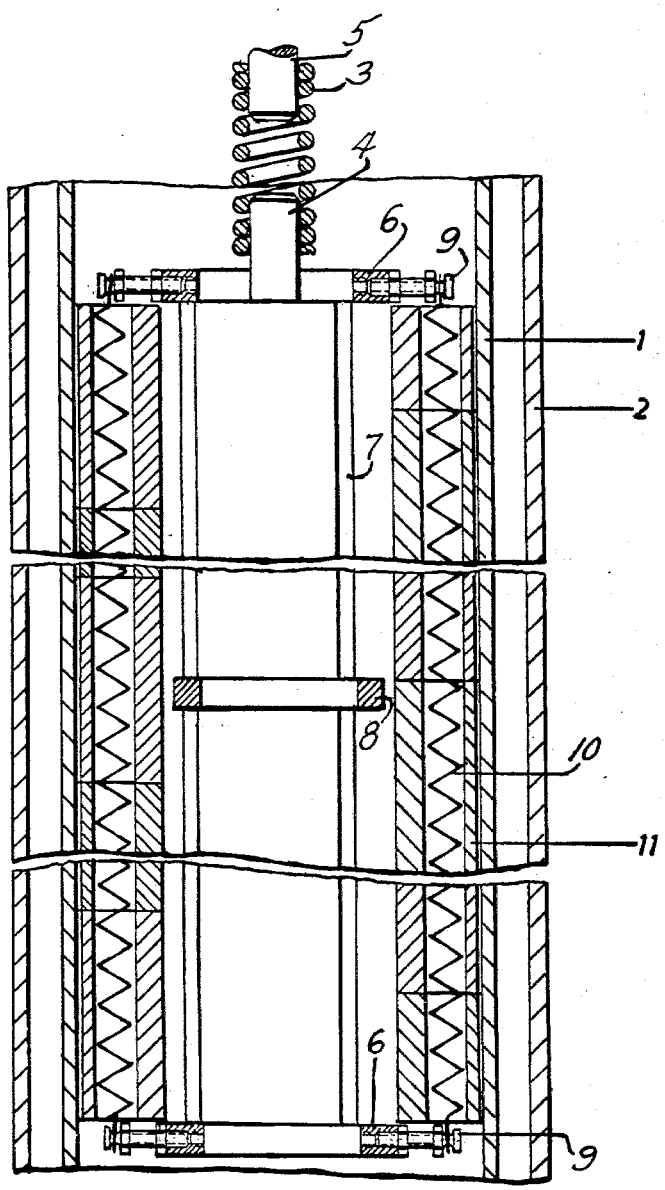
FIG. 1 is a longitudinal sectional view of a portion of a film evaporator in accordance with the invention showing one form of mounting of the sliding elements.
Figure 2:
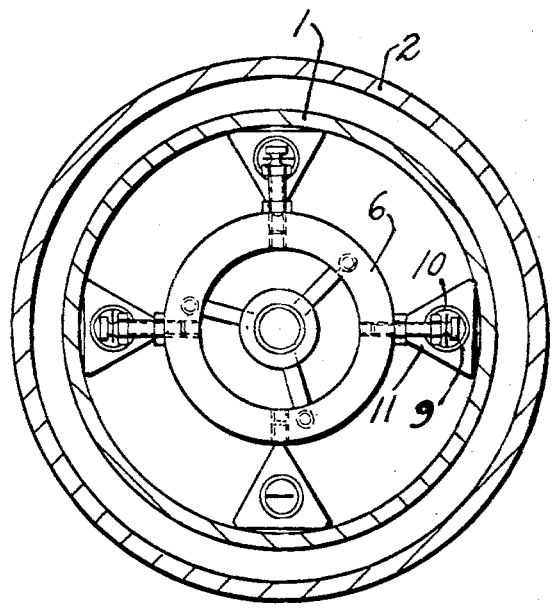
FIG. 2 is a cross-sectional view of the evaporator shown in FIG. 1 showing one shape of the sliding elements.

Referring to FIG. 1 the evaporator comprises the tube 1 provided with a steam jacket 2. The rotor is in the form of a rotatable bracket the shaft 4 of which is connected to the drive shaft 5 by the spring 3. The basket consists of the rings 6 which are connected to each other through the spacing ring 8 by the rods 7. The rings 6 are provided with holding pins 9 which support the springs 10. The springs 10 are surrounded by the sliding element sleeves 11. As appears in FIG. 2 the sleeves 11 are triangular in cross-section and have plane sides. In normal operation the elastically mounted sleeves 11 are pressed outwardly by the centrifugal force created by the rotation of the basket and produce a good film of fluid or readily smearable material on the wall of 1 of the vaporizer. In this operation the sleeves 11 move with a face against the wall 1 and without rotation. However when the sleeves encounter great resistance as in the case of high viscosity or not readily smearable materials or encrustations the sleeves are caused to roll over the sharp cutting edges between adjacent sides. Thus sudden cutting actions are exerted upon the material adhering to the wall and it is deformed and loosened. The rolling of the sliding elements creates a vibrating movement thereof which due to the fact that many elements are mounted on the stretched bands results in action thereof upon the entire surface. Besides the rotation there is also a lateral oscillation which effects not only a good distribution of the material under treatment but also an additional purifying effect.

Figure 3:
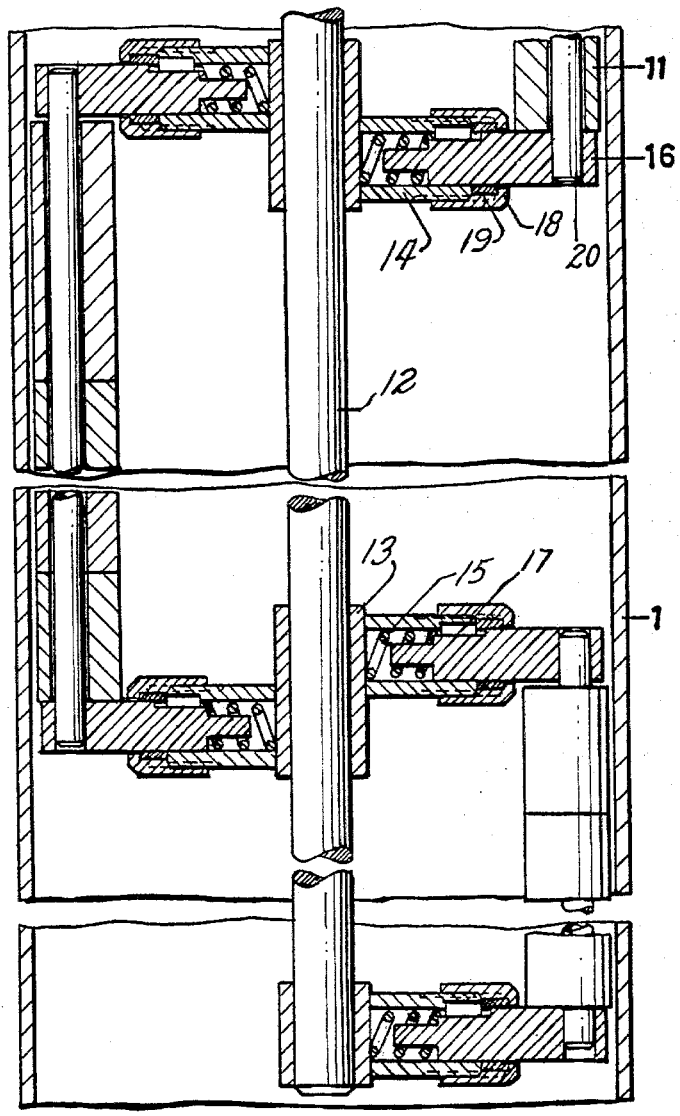
FIG. 3 is a longitudinal sectional view of a portion of a modified form of evaporator showing another form of mounting of the sliding elements.
Figure 4:
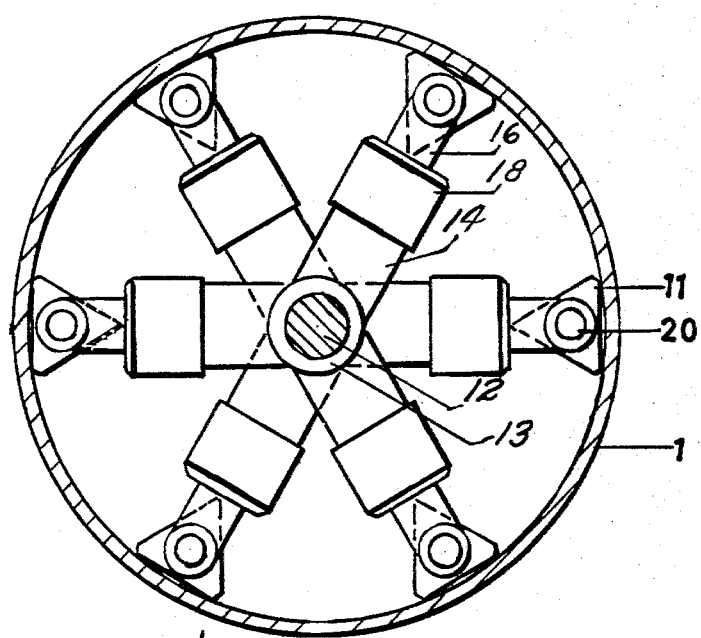
FIG. 4 is a cross-sectional view of the evaporator shown in FIG. 3, FIGS. 5, 6, 7, 8 and 9 are cross-sectional views illustrating other forms of the sliding element.

The sliding elements can be formed as sleeves and mounted upon radially movable spindles carried by the elastic springs as shown in FIGS. 3 and 4.

Referring to FIGS. 3 and 4 the shaft 12 is mounted to rotate within the vaporization tube 1. The shaft 12 carries the sleeves 13 to which the radially extending sleeves 14 are secured. Springs 15 are seated in the sleeves 14 and are held under pressure by the pins 16. The pins 16 are prevented from turning by the keys 17. Screw caps 18, provided with packing rings 19 hold the keys 17 and protect the space in which the springs 15 are seated. The pins 16 support the spindles 20 and the sliding bodies 11 seated thereon. The connection between the spindles 20 and the bores in the pins 16 can be either fixed or loose, permitting rotation of the spindles 20.

It is especially advantageous to make the sliding bodies in the form of relatively short sections which rest upon each other.

The preferred form of the sliding element has three sides and three cutting edges.

Figure 5:
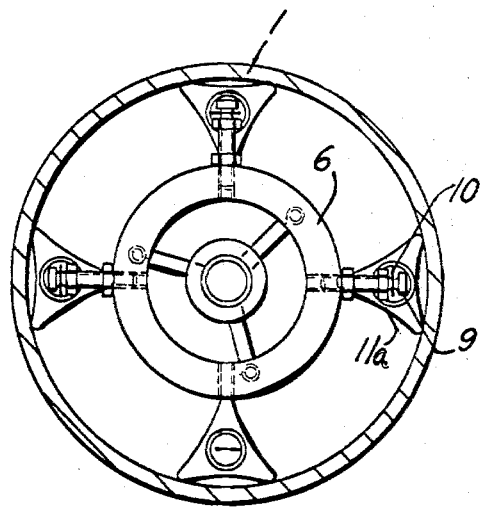
Figure 6:
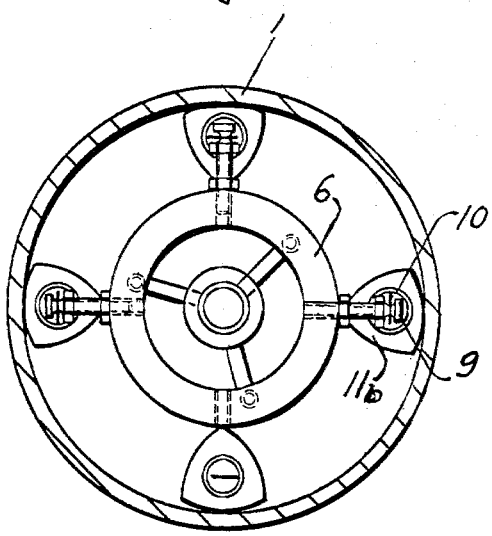

The modified form of the sliding elements 11a shown in FIG. 5 have concave surfaces and rounded edges while the modified form 11b shown in FIG. 6 have slightly convex surfaces with sharp edges.

Figure 7:
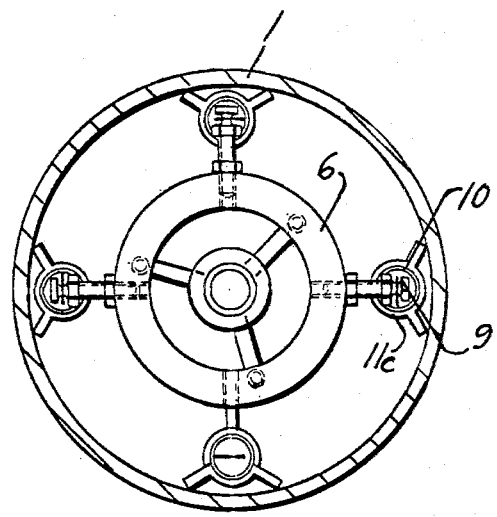

The sliding elements 11c shown in FIG. 7 have three vanes, two of which are in contact with the vaporizer wall.

Figure 9:
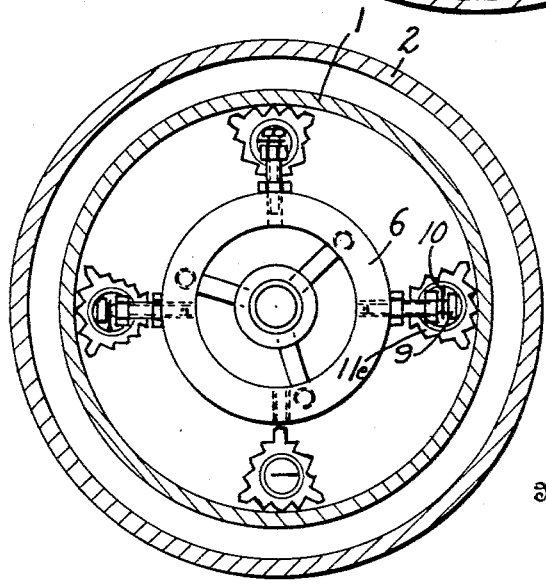
Figure 8:
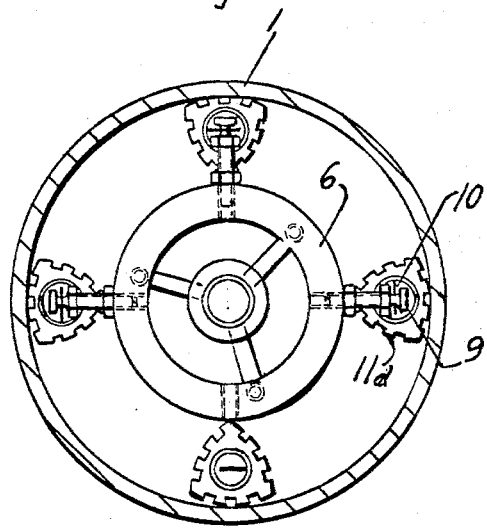

For the treatment of highly viscous, nearly rubber like material the triangular forms of sliding elements 11d and 11e shown in FIGS. 8 and 9 having longitudinal grooves in their faces are preferred in order to provide a strongly kneading action on the product.

By choice of the curvature of the curved surfaces or the profiling and sharpness of the cutting edges on the one hand and the elastic tension of the supports on the other hand the apparatus may be adapted to the type of material to be treated.

Even the distillation or vaporization of highly viscous material which tends to form a crust can be controlled by the use of the differently formed, vibrating sliding elements of the present invention.

I claim:

1. An evaporating apparatus comprising an evaporating chamber having a cylindrical inner surface, a vapor exhaust outlet in its upper portion, a feed inlet below said exhaust outlet, a concentrate outlet as its bottom portion, means for supplying heat to said surface and a structure rotatably mounted axially with respect to said surface, said structure comprising elastic supports extending longitudinally of and carried by said structure and sliding elements in the form of sleeves rotatably and radially flexibly mounted on said elastic supports in contact with said surface and extending substantially the entire length thereof, said sliding elements having regular polygonal cross-sections transverse to the axis of rotation of said structure and substantially plane sides and cutting edges between adjacent sides.

2. An evaporating apparatus as defined in claim 1 in which said sliding elements have arcuately concave sides facing said surface.

3. An evaporating apparatus as defined in claim 1 in which said sliding elements have arcuately convex sides facing said surface.

4. An evaporating apparatus comprising an evaporating chamber having a cylindrical inner surface, a vapor exhaust outlet in its upper portion, a feed inlet below said exhaust outlet, a concentrate outlet at its bottom portion, means for supplying heat to said surface and a structure rotatably mounted axially with respect to said surface, said structure comprising an axial shaft, radially extending springs supported by said shaft, spindles carried by said springs parallel to said surface and sliding elements in the form of sleeves rotatably and flexibly mounted on said spindles in contact with said surface, and extending substantially the entire length thereof, said sliding elements having regular polygonal cross-sections transverse to the axis of rotation of said structure and substantially plane sides and cutting edges between adjacent sides.

5. An evaporating apparatus as defined in claim 4 in which said sliding elements have arcuately concave sides facing said surface.

6. An evaporating apparatus as defined in claim 4 in which said sliding elements have convex sides facing said surface.

References Cited by the Examiner

UNITED STATES PATENTS 854,819    5/1907    Georges et al. _____ 15—104.13

FOREIGN PATENTS 182,034    3/1907    Germany.
1,114,838  10/1961   Germany.
1,121,587  1/1962    Germany.
1,154,438  9/1963    Germany.
638,468    6/1950    Great Britain.

NORMAN YUDKOFF, *Primary Examiner.*

WALTER A. SCHELL, *Examiner.*